(12) United States Patent
Cornett et al.

(10) Patent No.: US 7,710,968 B2
(45) Date of Patent: May 4, 2010

(54) TECHNIQUES TO GENERATE NETWORK PROTOCOL UNITS

(75) Inventors: Linden Cornett, Portland, OR (US); Steven King, Portland, OR (US); Sujoy Sen, Portland, OR (US); Parthasarathy Sarangam, Portland, OR (US); Frank Berry, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 1019 days.

(21) Appl. No.: 11/382,874

(22) Filed: May 11, 2006

(65) Prior Publication Data

US 2007/0263629 A1    Nov. 15, 2007

(51) Int. Cl.
*H04L 12/28* (2006.01)

(52) U.S. Cl. .................................. 370/392; 370/395.52

(58) Field of Classification Search ........................ None
See application file for complete search history.

(56) References Cited

U.S. PATENT DOCUMENTS

| | | | |
|---|---|---|---|
| 7,012,918 B2 * | 3/2006 | Williams ..................... 370/389 |
| 7,055,085 B2 * | 5/2006 | McDaniel ................... 714/776 |
| 7,533,154 B1 * | 5/2009 | Chen et al. .................. 709/213 |
| 2005/0080928 A1 | 4/2005 | Beverly et al. |
| 2005/0144402 A1 | 6/2005 | Beverly |
| 2005/0216597 A1 | 9/2005 | Shah et al. |
| 2006/0004795 A1 | 1/2006 | Shah et al. |
| 2006/0004941 A1 | 1/2006 | Shah et al. |
| 2006/0004983 A1 | 1/2006 | Tsao et al. |
| 2006/0034283 A1 * | 2/2006 | Ko et al. ..................... 370/392 |
| 2006/0067346 A1 * | 3/2006 | Tucker et al. ............... 370/412 |
| 2006/0101225 A1 * | 5/2006 | Aloni et al. ................. 711/202 |
| 2006/0133422 A1 * | 6/2006 | Maughan et al. ............ 370/474 |
| 2006/0136697 A1 | 6/2006 | Tsao et al. |
| 2006/0146814 A1 * | 7/2006 | Shah et al. .................. 370/389 |
| 2006/0149919 A1 | 7/2006 | Arizpe et al. |
| 2006/0274788 A1 | 12/2006 | Pong |
| 2008/0043750 A1 * | 2/2008 | Keels et al. ............ 370/395.52 |

OTHER PUBLICATIONS

"Windows Network Task Offload", updated Dec. 4. 2001, http://www.microsoft.com/whdc/device/network/taskoffload.mspx?pf=true, 4 pages.
Hemal Shah et al., Direct Data Placement Over Reliable Transports (Version 1.0), pp. 1-35. Oct. 2002.

* cited by examiner

Primary Examiner—Phirin Sam
(74) Attorney, Agent, or Firm—Glen B Choi

(57) ABSTRACT

A first logic offloads some network protocol unit formation tasks to a second logic. The first logic may request that data be transmitted using a Direct Data Placement (DDP) compatible network protocol unit. The first logic may provide the data as well as other information relevant to forming the DDP compatible network protocol unit. The second logic may form portions of the DDP compatible network protocol unit using the data and the provided information.

29 Claims, 6 Drawing Sheets

TECHNIQUES TO GENERATE NETWORK PROTOCOL UNITS

FIELD

The subject matter disclosed herein relates to techniques to generate network protocol units.

RELATED ART

The Direct Data Placement (DDP) protocol provides a capability to place upper layer protocol (ULP) data directly into a final destination in a memory without processing by the ULP. A series of protocols can be layered to transmit and receive information using DDP. FIG. 1 depicts an example frame format formed in accordance with the DDP protocol. As shown, a DDP segment may include a Transmission Control Protocol (TCP) header, marker-based protocol-data-unit-aligned (MPA) header, DDP header, Remote Direct Memory Access (RDMA) header, payload, and cyclical redundancy check (CRC) value.

For example, the DDP protocol may be described in "Direct Data Placement over Reliable Transports" (Version 1.0) (2002) available from the RDMA Consortium, as well as revisions thereof; the TCP/IP protocol may be described at least in the publication entitled "Transmission Control Protocol: DARPA Internet Program Protocol Specification," prepared for the Defense Advanced Projects Research Agency (RFC793) (September 1981), as well as revisions thereof; the MPA protocol may be described at "Marker PDU Aligned Framing for TCP Specification" (Version 1.0) (2002) available from the RDMA Consortium, as well as revisions thereof and "Marker PDU Aligned Framing for TCP Specification" from the IETF working forum Remote Direct Data Placement Work Group (Feb. 2004) as well as revisions thereof; and the RDMA protocol may be described in "An RDMA Protocol Specification" (version 1.0) (2002) available from the RDMA Consortium, as well as revisions thereof.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Figure 1:
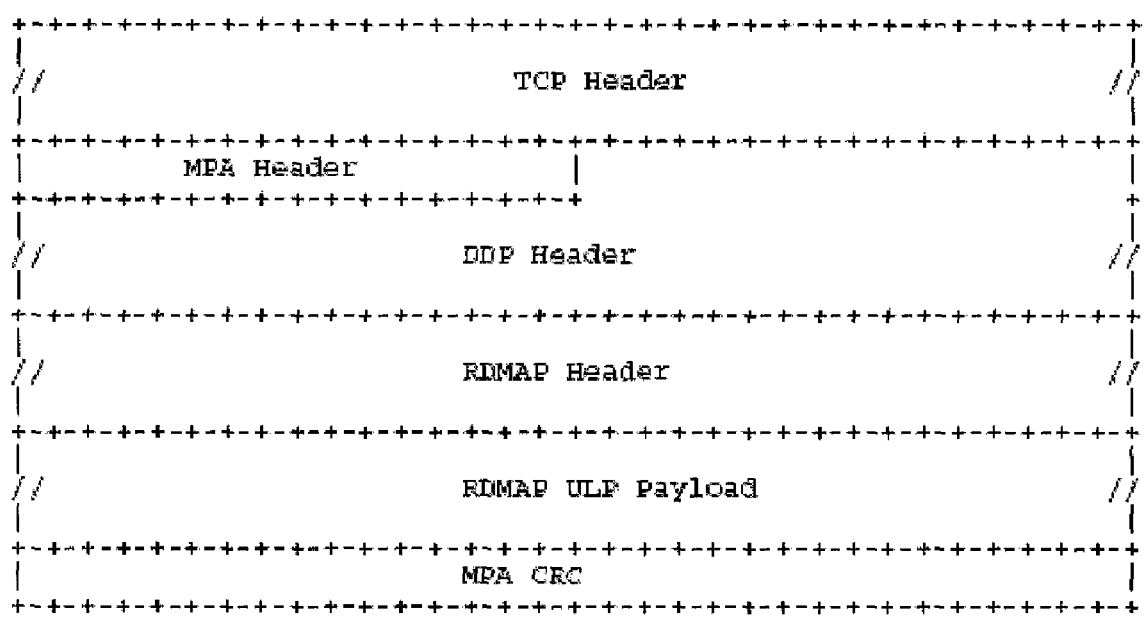
FIG. 1 depicts an example frame format formed in accordance with the DDP protocol.
Figure 2:
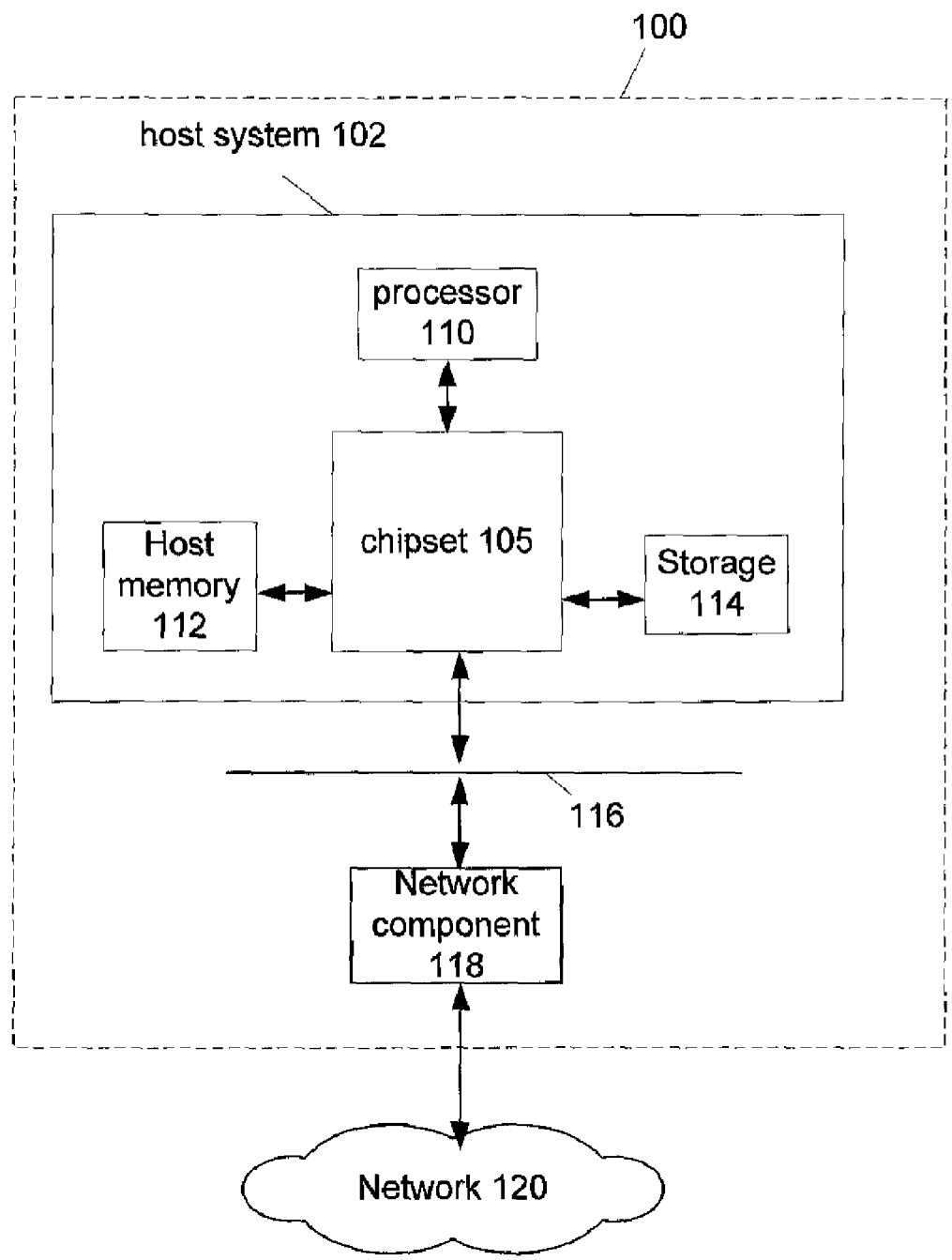
FIG. 2 depicts an example system embodiment in accordance with some embodiments of the present invention.

FIG. 2 depicts in computer system 100 a suitable system in which some embodiments of the present invention may be used. Computer system 100 may include host system 102, bus 116, and network component 118.

Host system 102 may include chipset 105, processor 110, host memory 112, and storage 114. Chipset 105 may provide intercommunication among processor 110, host memory 112, storage 114, bus 116, as well as a graphics adapter that can be used for transmission of graphics and information for display on a display device (both not depicted). For example, chipset 105 may include a storage adapter (not depicted) capable of providing intercommunication with storage 114. For example, the storage adapter may be capable of communicating with storage 114 in conformance at least with any of the following protocols: Small Computer Systems Interface (SCSI), Fibre Channel (FC), and/or Serial Advanced Technology Attachment (S-ATA).

In some embodiments, chipset 105 may include data mover logic (not depicted) capable to perform transfers of information within host system 102 or between host system 102 and network component 118. As used herein, a "data mover" refers to a module for moving data from a source to a destination without using the core processing module of a host processor, such as processor 110, or otherwise does not use cycles of a processor to perform data copy or move operations. By using the data mover for transfer of data, the processor may be freed from the overhead of performing data movements, which may result in the host processor running at much slower memory speeds compared to the core processing module speeds. A data mover may include, for example, a direct memory access (DMA) engine. In some embodiments, data mover may be implemented as part of processor 110, although other components of computer system 100 may include the data mover.

Processor 110 may be implemented as Complex Instruction Set Computer (CISC) or Reduced Instruction Set Computer (RISC) processors, multi-core, or any other microprocessor or central processing unit. Host memory 112 may be implemented as a volatile memory device such as but not limited to a Random Access Memory (RAM), Dynamic Random Access Memory (DRAM), or Static RAM (SRAM). Storage 114 may be implemented as a non-volatile storage device such as but not limited to a magnetic disk drive, optical disk drive, tape drive, an internal storage device, an attached storage device, flash memory, battery backed-up synchronous DRAM (SDRAM), and/or a network accessible storage device.

Bus 116 may provide intercommunication among at least host system 102 and network component 118 as well as other peripheral devices (not depicted). Bus 116 may support serial or parallel communications. Bus 116 may support node-to-node or node-to-multi-node communications. Bus 116 may at least be compatible with Peripheral Component Interconnect (PCI) described for example at Peripheral Component Interconnect (PCI) Local Bus Specification, Revision 3.0, Feb. 2, 2004 available from the PCI Special Interest Group, Portland, Oreg., U.S.A. (as well as revisions thereof); PCI Express described in The PCI Express Base Specification of the PCI Special Interest Group, Revision 1.0a (as well as revisions thereof); PCI-x described in the PCI-X Specification Rev. 1.1, Mar. 28, 2005, available from the aforesaid PCI Special Interest Group, Portland, Oreg., U.S.A. (as well as revisions thereof); and/or Universal Serial Bus (USB) (and related standards) as well as other interconnection standards.

Network component 118 may be capable of providing intercommunication between host system 102 and network 120 in compliance at least with any applicable protocols. Network component 118 may intercommunicate with host system 102 using bus 116. In one embodiment, network component 118 may be integrated into chipset 105. "Network component" may include any combination of digital and/or analog hardware and/or software on an I/O (input/output) subsystem that may process one or more packets to be transmitted and/or received over a network. In one embodiment, the I/O subsystem may include, for example, a network component card (NIC), and network component may include, for example, a MAC (media access control) layer of the Data Link Layer as defined in the Open System Interconnection (OSI) model for networking protocols. The OSI model is defined by the International Organization for Standardization (ISO) located at 1 rue de Varembe, Case postale 56 CH-1211 Geneva 20, Switzerland.

In some embodiments, the network component transmits a series of DDP segments when supplied with bulk data from a host otherwise too large to fit into a single segment. In some embodiments, a host system includes a capability to offload to the network component at least determination and insertion of certain fields of IP, TCP, DDP, and MPA headers of a DDP segment. In some embodiments, the host system includes a capability to offload tasks to the network component at least of: subdividing bulk data into payload sized portions, inserting a pad into a network protocol unit, inserting a marker into a network protocol unit, and determining and inserting a CRC value into a network protocol unit. As used herein, a "network protocol unit" may include any packet or frame or other format of information with a header and payload portions formed in accordance with any protocol specification. Accordingly, a host processor (e.g., CPU) or other logic may be relieved of tasks at least of forming certain header fields, subdividing bulk data into payload sized portions, inserting pads, inserting markers, and determining and inserting CRC values.

In some embodiments, network component may include the capability to form network protocol units in accordance with TCP large send offload (LSO) schemes. A suitable TCP LSO technique is provided in the Microsoft Windows Server 2003 Driver Development Kit (DDK) (2003).

Network 120 may be any network such as the Internet, an intranet, a local area network (LAN), storage area network (SAN), a wide area network (WAN), or wireless network. Network 120 may exchange traffic with network component 118 using the Ethernet standard (described in IEEE 802.3 and related standards) or any communications standard.

Figure 3:
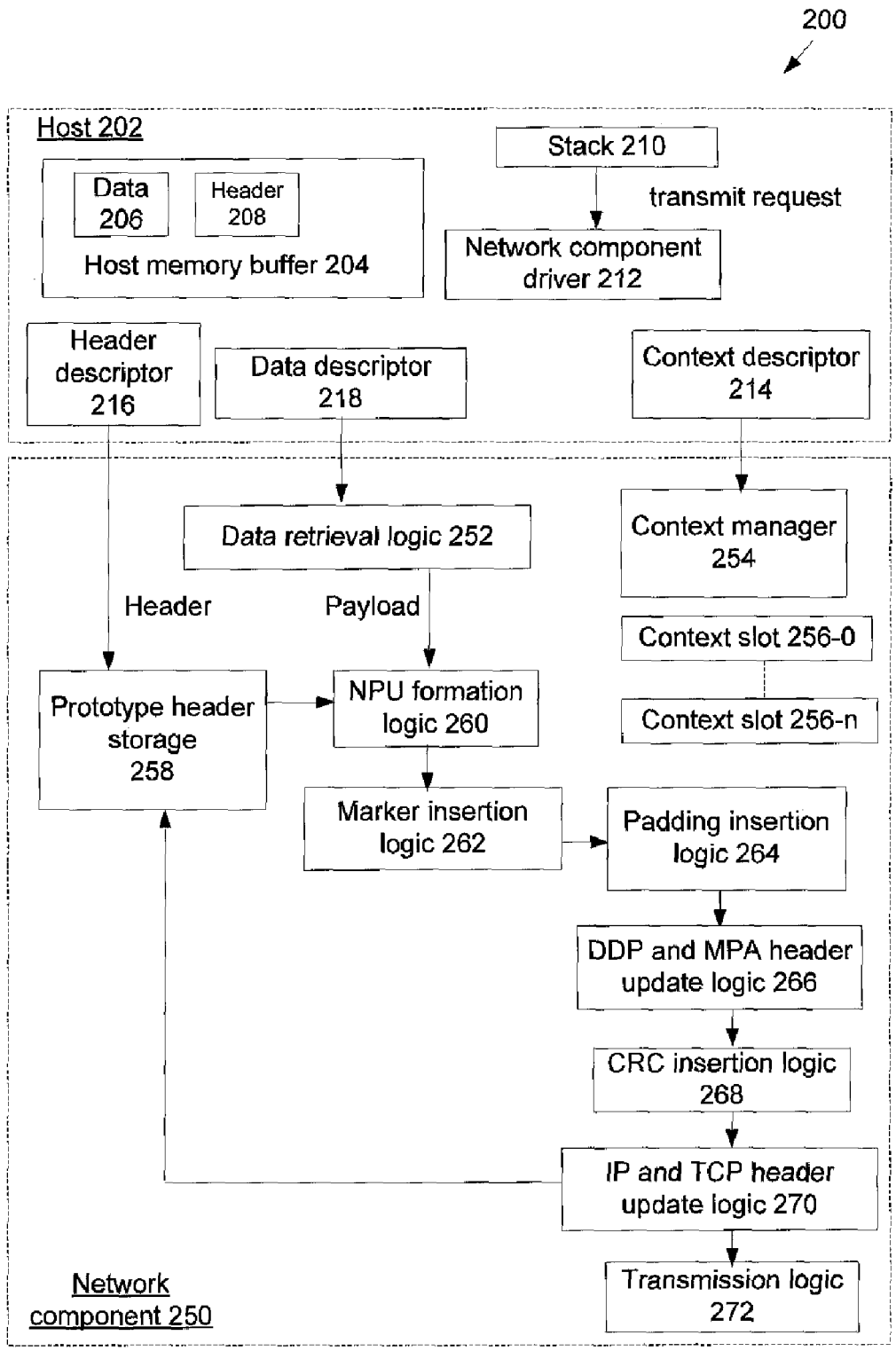
FIG. 3 depicts an example of elements that can be used in some embodiments of the present invention.

FIG. 3 depicts an example of elements that can be used in some embodiments of the present invention. For example, system 200 may include host 202 and network component 250. In some embodiments, host 202 may instruct network component 250 or other logic to at least generate portions of a network protocol unit that complies with the DDP protocol. In some embodiments, host 202 may instruct network component 250 or other logic at least to generate fields of at least DDP, MPA, TCP, and/or IP protocol headers. In some embodiments, host 202 may instruct network component 250 or other logic at least to subdivide bulk data into payload sized portions, insert padding and markers, and to generate and insert CRC or other integrity validation values into the network protocol unit.

Some embodiments of host 202 may include host memory buffer 204, stack 210, and network component driver 212. Host memory buffer 204 may store at least one or more portion of data 206 and one or more header template 208. Data 206 may be transmitted in one or more network protocol units compliant at least with the DDP protocol. Header template 208 may include header information prescribed by the DDP protocol. For example, header template 208 may include at least certain completed IP and TCP header fields as well as a completed RDMA header. Completed IP header fields may include the following fields described in the IP specification: source and destination IP addresses, version, "Type of Service", "Time to Live", protocol ID. Completed TCP header fields may include the following fields described in the TCP specification: "TCP header length", TCP source and destination port, "segment acknowledgement number", "segment window", and "Options"

Stack 210 may be capable to request the transmission of data using one or more network protocol units in accordance at least with the DDP protocol. To transmit data, in some embodiments, stack 210 may issue to network component driver 212 a transmit request with a pointer to relevant data.

Network component driver 212 may be capable to generate one or more contexts in response to a transmit request. For example, a context may include at least: information pertaining to a state of a connection (e.g., TCP/IP state and RDMA state), the byte count to the byte position in which a start of a next marker is to be inserted, as well as TCP sequence number which may be used to maintain protocol continuity among a series of frames in a connection that are transmitted at different times. In response to the transmit request, network component driver 212 may also generate context descriptor 214, header descriptors 216, and data descriptors 218. Context descriptor 214 may point to a context (not depicted) in host memory. Header descriptor 216 may point to a header template in host memory. Data descriptor 218 may point to data in host memory. A descriptor ring (not depicted) may be used to transfer header descriptors, data descriptors, and context descriptors to network component 250.

Some embodiments of network component 250 may include data retrieval logic 252, context manager 254, prototype header storage 258, network protocol unit (NPU) formation logic 260, marker insertion logic 262, padding insertion logic 264, DDP and MPA header update logic 266, CRC insertion logic 268, IP and TCP header update logic 270, and transmission logic 272. Data retrieval logic 252 may at least retrieve header and data from host memory buffer 204 associated with respective header descriptor and data descriptor from host 202. For example, data retrieval logic 252 may include a data mover that may be used to transfer data and header from host 202 to network component 250.

Context manager 254 may store contexts associated with context descriptors 214 into one or more of context slots 256-0 to 256-n, where n≧0. Context manager 254 may store a context into a context slot specified by host 202. Data mover logic may transfer contexts from host 202 to network component 250. Network component 250 may use contexts to form one or more network protocol unit.

Prototype header storage 258 may determine and store a prototype header based at least on a header template retrieved from host 202 as well as the associated context. The prototype header may include some fields provided by the header template from host 202. The prototype header may include one or more fields determined by prototype header storage 258.

Prototype header storage 258 may determine header fields specified at least by the following protocols: IP, TCP, MPA, and DDP. For example, IP header fields determined by prototype header storage 258 may include: length, IP identification and IP checksum. For example, the TCP header fields determined by prototype header storage 258 may include: "Sequence Number", and TCP flags such as but not limited to "FIN" and "PSH". For example, the MPA fields determined by prototype header storage 258 may include: ULPDU length. For example, the DDP fields determined by prototype header storage 258 may include: "last flag", "tagged offset", and "message offset".

Network protocol unit (NPU) formation logic 260 may form a DDP segment for transmission but with some header fields yet to be completed as well as without markers, optional padding, and CRC value. NPU formation logic 260 may retrieve a payload size worth of data from host memory. NPU formation logic 260 may determine the payload size based at least on an associated context which specifies the maximum segment size and in accordance with relevant protocols such as the DDP protocol. NPU formation logic 260 may receive the prototype header from prototype header storage 258. NPU formation logic 260 may insert header fields into a DDP segment using fields provided in the prototype header.

Marker insertion logic 262 may receive a segment from NPU formation logic 260 and place one or more marker in the segment based at least on information from the prototype header and context in accordance at least with the MPA protocol. The segment may be a DDP segment with some IP, TCP, MPA, DDP, and RDMA protocol header fields completed but with some header fields yet to be completed and not include at least markers, optional padding, and a CRC value.

Padding insertion logic 264 may selectively insert a pad in the current segment in accordance at least with the MPA protocol. For example, the pad may be zero to three bytes in size. The segment may be a network protocol unit with some IP, TCP, MPA, DDP, and RDMA protocol header fields completed and potentially with one or more inserted marker and not yet include optional padding and a CRC value.

DDP and MPA header update logic 266 may update some DDP fields based in part on content of the prototype header and in accordance with DDP and MPA protocols. For example, the following DDP fields may be updated: "last flag", "tagged offset", and "message offset". DDP and MPA header update logic 266 may update the ULPDU length fields of the MPA header based on a potentially inserted marker and the pad size.

CRC insertion logic 268 may determine a CRC value across one or more portion of the segment in accordance at least with the MPA protocol. The segment may be a network protocol unit with some IP, TCP, MPA, DDP, and RDMA protocol header fields completed and potentially with one or more inserted marker and a pad but without a CRC value. CRC insertion logic 268 may insert a determined CRC value into the segment. In some embodiments, integrity validation values other than a CRC value may be determined based on one or more portion of the segment.

IP and TCP header update logic 270 may update fields of IP and TCP headers. IP and TCP header update logic 270 may change the following fields: TCP sequence number, and IP identification fields based on the current segment and in accordance with IP and TCP protocol specifications. IP and TCP header update logic 270 may determine the "TCP checksum" and "Maximum Segment Size" fields based on the completed segment and in accordance with IP and TCP protocol specifications. The segment may be a network protocol unit with some IP, TCP, MPA, DDP, and RDMA protocol header fields completed and potentially with one or more inserted marker and a pad and with a CRC value. IP and TCP header update logic 270 may potentially update IP and TCP header fields in the prototype header managed by prototype header storage 258 in accordance with IP and TCP protocols.

Transmission logic 272 may include the capability to transmit one or more network protocol unit over a physical interface. For example, the transmitted one or more network protocol unit may be compliant at least with DDP.

Figure 4:
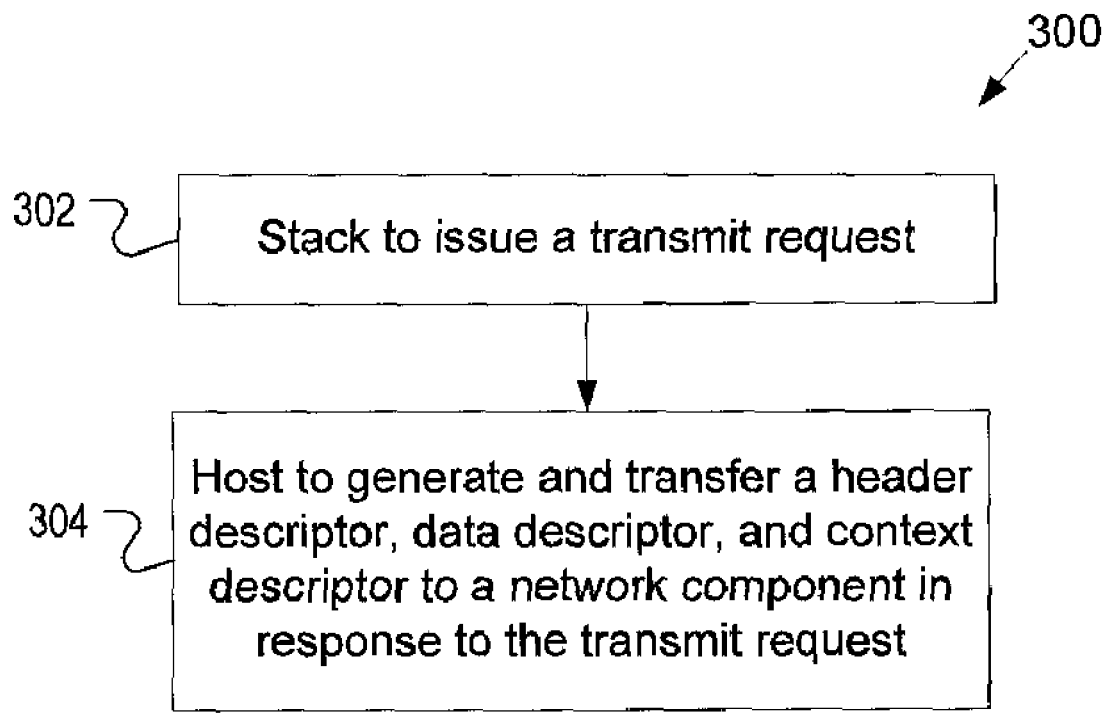
FIG. 4 depicts a flow diagram that can be used to instruct a network component to form at least one network protocol unit for transmission, in accordance with some embodiments of the present invention.

FIG. 4 depicts a flow diagram of a process 300 that can be used to instruct a network component to form at least one network protocol unit for transmission, in accordance with some embodiments of the present invention.

In block 302, a stack may issue a transmit request. For example, the stack may request that bulk data be transmitted in one or more DDP segment. For example, the stack may request that one or more payload worth of data be prepared for transfer in accordance with the DDP protocol. For example, the stack may be executed by a host computer or other logic. In some embodiments, the host may offload network protocol unit formation tasks such as one or more of subdividing the bulk data into payload sized portions, determining one or more protocol header fields, inserting padding, inserting one or more marker, and determining and inserting a CRC value.

In block 304, the host may generate and transfer a header descriptor, data descriptor, and context descriptor to a network component in response to the transmit request. For example, logic such as a network component driver may generate a context associated with the transmit request. The header descriptor may refer to a location a header template is stored. The header template may include information prescribed by the DDP protocol. For example, the header template may include the same or similar information as stored by header template 208 described earlier. The data descriptor may refer to an area of memory in which data is stored that is to be transmitted. The data may be transmitted in one or more DDP protocol compliant network protocol units.

Figure 5:
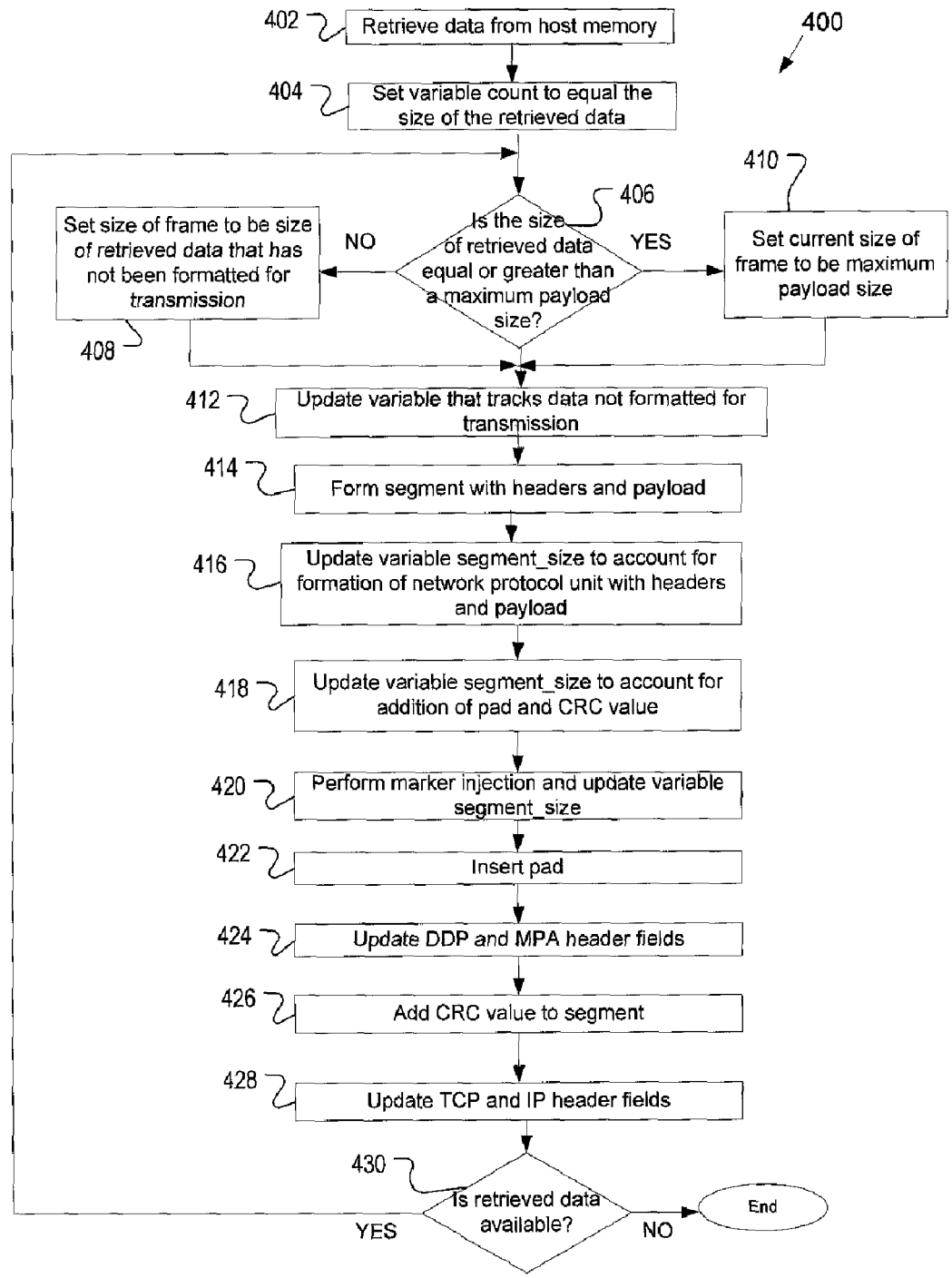
FIG. 5 depicts an example process that can be used by a network component to form one or more network protocol unit for transmission, in accordance with some embodiments of the present invention.

FIG. 5 depicts an example process 400 that can be used by a network component to form one or more network protocol unit for transmission, in accordance with some embodiments of the present invention. The one or more network protocol unit may be compliant at least with the DDP protocol. In some embodiments, the network component transmits a series of DDP segments when supplied with bulk data from a host otherwise too large to fit into a single segment.

Block 402 may include a network component retrieving data from a host memory buffer. The data may be retrieved in response to a transmit request or other request to transmit data from a host device through a network. For example, the data may be transferred from the host device to the network component using data mover logic.

Block 404 may include the network component setting variable "count" to indicate a size of the retrieved data that has not been formatted in a network protocol unit for transmission. For example, the variable "count" may indicate a number of bytes in the retrieved data. After a portion of the retrieved data is formatted for transmission in a network protocol unit by the network component, variable "count" may be reduced by an amount equal to the size of data formatted for transmission.

Block 406 may include the network component determining whether the size of the retrieved data is equal to or greater than a maximum payload size. The maximum payload size of a frame may be the maximum size prescribed by an applicable protocol such as the DDP protocol, although other protocols may be used, and/or the relevant context. Variable "segment_max" may represent a maximum payload size of a frame prescribed by a relevant protocol and/or the relevant context. For example, block 406 may include the determination of whether variable "count" is greater than or equal to variable "segment_max". If the size of the retrieved data is not equal to and not greater than a maximum payload size of a frame, then block 408 may follow. If the size of the retrieved data is equal to or greater than a maximum payload size of a frame, then block 410 may follow.

Block 408 may include the network component setting a variable indicating a current size of the segment equal to that of the size of the retrieved data that has not been formatted for transmission (i.e., variable "count"). For example, variable "segment_size" may represent a current size of the segment. For example, block 408 may include setting variable "segment_size" to equal variable "count". Variable "segment_size" may change depending on whether other content is added to the segment. The formed frame may be considered a runt frame because the payload size is smaller than a prescribed maximum size. Block 412 may follow block 408.

Block 410 may include the network component setting a variable indicating a current size of the segment equal to that of the maximum payload size of a frame. For example, variable "segment_size" may represent a current size of the segment. For example, block 410 may include setting variable "segment_size" to equal variable "segment_max". Accordingly, some data retrieved in block 402 may be left over for use in another network protocol unit. Block 412 may follow block 410.

Block 412 may include the network component reducing the variable that tracks a size of the retrieved data that has not been formatted for transmission by the network component (i.e., variable "count") by an amount of the retrieved data allocated in block 408 or 410 (i.e., variable "segment_size").

Block 414 may include the network component forming a segment that is a network protocol unit which has headers and a payload formed in accordance with the DDP protocol. The headers may be IP, TCP, MPA, DDP, and RDMA headers as prescribed by the DDP protocol. The payload may be an amount of retrieved data having a size of that set in either block 408 or 410. The segment may be a DDP protocol compatible segment but with some header fields yet to be completed as well as without markers, optional padding, and CRC value.

Block 416 may include updating the variable that tracks a size of a segment to indicate that a network protocol unit compliant with the DDP protocol has been assembled but without markers, without optional padding, and without CRC value. For example, the size of headers and payload may be prescribed by the DDP protocol.

Block 418 may include updating the variable indicating the segment size (i.e., variable "segment_size") to account for addition of a pad and a CRC value to the segment. For example, the addition of a pad may occur subsequently in block 422 whereas addition of a CRC value to the segment may occur subsequently in block 426. For example, each of the added pad and CRC value may be a size prescribed by the MPA protocol. Updating of the variable "segment_size" to account for addition of a pad and a CRC value may occur prior to insertion of markers because placement of markers may take into account a segment that includes a pad and a CRC value.

Figure 6:
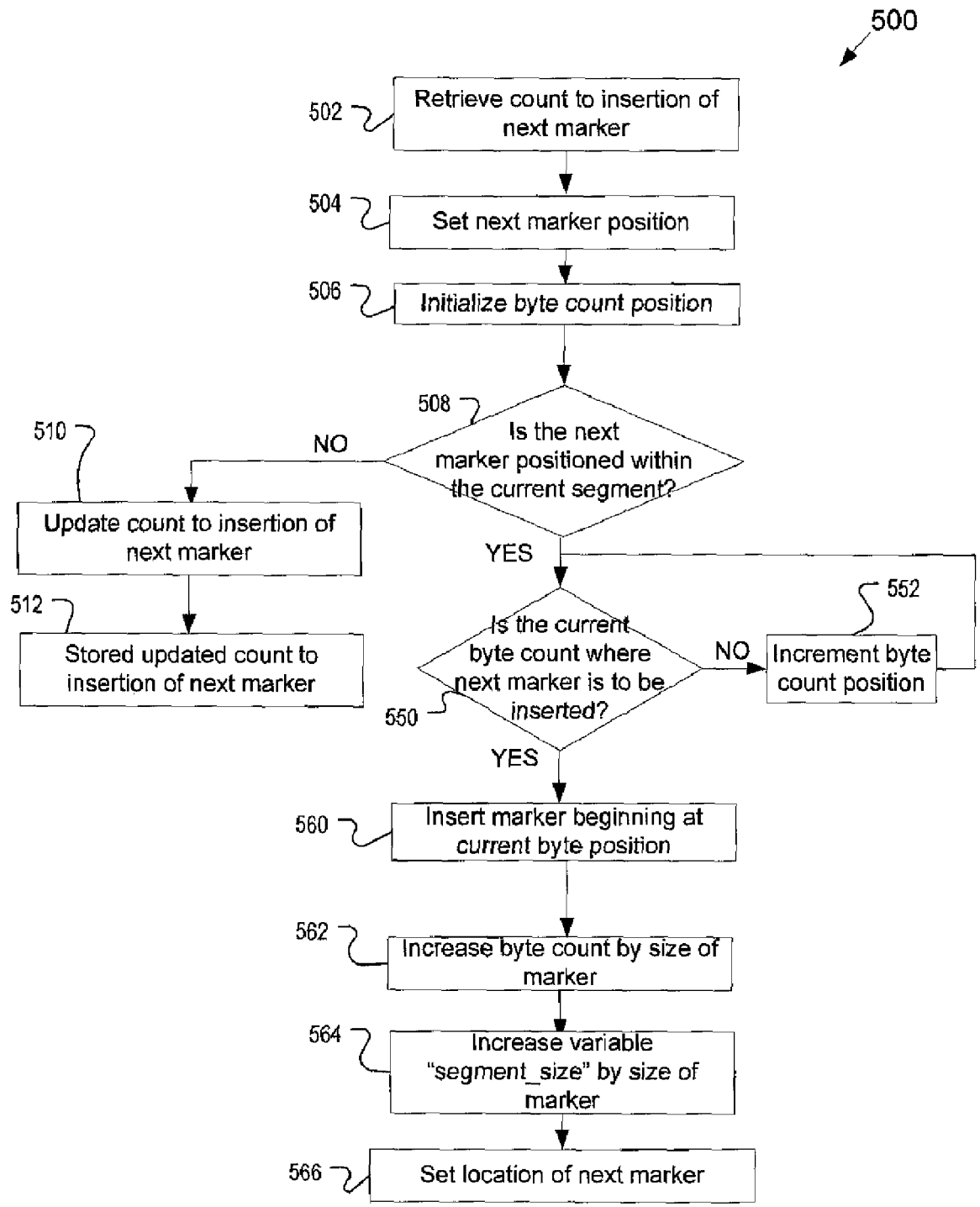
FIG. 6 depicts an example process that can be used to insert one or more marker into a segment in accordance with some embodiments of the present invention.

Block 420 may include injecting one or more marker into the segment as well as updating the variable indicating the segment size (i.e., variable "segment_size") to indicate addition of one or more marker. The one or more marker may be inserted in accordance with the MPA protocol. FIG. 6 provides a detailed description of one possible manner to insert one or more marker, in accordance with some embodiments of the present invention, although any techniques may be used to insert one or more marker.

Block 422 may include the network component inserting a pad. For example, the pad may be zero to three bytes in size. A pad may be inserted in accordance with the MPA protocol.

Block 424 may include updating some DDP and MPA header fields For example, the following DDP fields may be updated: "last flag", "tagged offset", and "message offset". For example, the following MPA fields may be updated: ULPDU length field. The ULPDU length field may be updated based on a potentially inserted marker and the pad size.

Block 426 may include the network component determining a CRC value and inserting the CRC value into the segment. For example, the CRC value may be determined in accordance with the MPA protocol over one or more portion of the segment. Integrity validation values other than a CRC value may be determined and inserted that are based on one or more portion of the segment.

Block 428 may include the network component updating TCP and IP header fields of the segment. For example, the header may be generated by the network component. Block 428 may provide a DDP compliant segment ready for transmission to a network, although other protocols may be used.

Block 430 may include the network component determining whether retrieved data is available for use to form a payload of another frame. For example, block 430 may include determining whether the value stored by variable "count" is greater than zero. If retrieved data is available for use to form another frame, then block 406 may follow. If retrieved data is available for use to form another frame, then process 400 may end.

FIG. 6 depicts an example process 500 that can be used to insert one or more marker into a segment in accordance with some embodiments of the present invention. Block 502 may include the network component retrieving a variable indicating the byte count to the byte position in which a start of a next marker is to be inserted. For example, variable "marker_offset" may indicate a byte count to the byte position in which a start of a next marker is to be inserted. Variable "marker_offset" may be provided to the network component by the host or other source in a context. For example, variable "marker_offset" may be used in order to track a number of left-over bytes after a marker in a previous frame so that marker positions between sequential frames may be maintained. For example, markers may be inserted as prescribed by the MPA protocol.

Block 504 may include the network component setting a variable indicating a position of a beginning of a next marker in the current frame to be equal to the variable indicating the byte count to the byte position in which a beginning of a next marker is to be inserted (i.e., variable "marker_offset"). For example, the variable "next_marker" may indicate a position of a beginning of a next marker in the current frame relative to the beginning of the current frame. For example, block 504 may include setting variable "next_marker" to equal variable "marker_offset".

Block 506 may include the network component initializing a variable used to count byte positions for determining whether a next marker is to be inserted. For example, variable "byte_num" may indicate a byte position count at least for purposes of determining whether a next marker is to be inserted. For example, block 506 may include setting variable "byte_num" to equal zero.

Block 508 may include the network component determining whether the next marker is to be formed within the current segment. For example, variable "segment_size" may indicate the size of the current segment. The current segment may be a network protocol unit formed in accordance with the DDP protocol and whose size accounts for addition of a pad and a CRC value. For example, variable "segment_size" may be set by process 400. For example, block 508 may include a determination of whether variable "next_marker" is less than or equal to variable "segment_size". If the next marker is not to be formed with the current segment, then block 510 may follow. If the next marker is to be formed with the current segment, then block 550 may follow.

Block 510 may include the network component updating a variable used to indicate the byte count to the byte position in which a beginning of a next marker is to be inserted (i.e., variable "next_marker") by reducing such byte count by the byte size of a current segment (i.e., variable "segment_size"). According to the MPA protocol, the markers may be inserted every 512 bytes. For example, block 510 may include subtracting variable "segment_size" from variable "next_marker". Block 510 may apply when no marker is to be put into the current frame.

Block 512 may include the network component storing the updated variable used to indicate the byte count to the byte position in which a beginning of a next marker is to be inserted into the relevant context. For example, block 512 may include storing the updated byte count to the byte position in which a beginning of a next marker is to be inserted (updated in block 510) as variable "marker_offset". Variable "marker_offset" may be stored in a context for use to determine whether and where a marker is to be stored in a next sequential frame.

Block 550 may include the network component determining whether the current byte position is where a beginning of a next marker is to be inserted. For example, block 550 may include a determination of whether variable "byte_num" is equal to variable "next_marker". If the current byte Position count is not where a next marker is to be inserted, then block 552 may follow. If the current byte position count is where a next marker is to be inserted, then block 560 may follow.

Block 552 may include incrementing the byte count by one. Block 550 may follow block 552.

Block 560 may include the network component inserting a marker beginning at the current byte position. For example, the current byte position may be represented by variable "byte_num". Under the MPA protocol, the marker is four (4) bytes, although any marker size may be used.

Block 562 may include the network component increasing the current byte count by the size of the inserted marker. For example, block 562 may include increasing variable "byte_num" by four, although any other marker size may be used.

Block 564 may include the network component increasing the size of a current segment by the size of the inserted marker. For example, the current segment size may be represented by variable "segment_size". For example, block 564 may include increasing variable "segment_size" by four, although any other marker size may be used.

Block 566 may include the network component setting the location of the next marker in a next sequential frame. For example, the next marker location may be represented by variable "marker_offset". According to the MPA protocol, the markers may be inserted every 512 bytes. For example, block 566 may include incrementing variable "marker_offset" by five-hundred-twelve (512) and subtracting a number of bytes in a byte count from the marker inserted in block 560 to the end of the current frame. Other increments between locations of markers may be used.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method comprising:
transferring a request from a first logic to a second logic, wherein the request includes a request to form a network protocol unit compliant with Direct Data Placement (DDP) protocol;
at the first logic, generating at least one header field for a header portion of at least one DDP compliant network protocol unit;
providing the generated at least one header field to the second logic;
at the second logic, generating at least one header field, and
at the second logic, selectively forming at least one network protocol unit compliant with the DDP protocol in response to the request and based on the generated header fields from the first and second logic, wherein the request comprises identification of data, identification of a header, and identification of a context and wherein each of the at least one network protocol unit comprises header and payload portions.

2. The method of claim 1, further comprising:
at the second logic, retrieving a portion of data from the first logic; and
at the second logic, forming the payload using the portion of data from the first logic.

3. The method of claim 1, further comprising:
at the second logic, inserting a marker into at least one DDP compliant network protocol unit.

4. The method of claim 1, further comprising:
at the second logic, inserting a pad into at least one DDP compliant network protocol unit.

5. The method of claim 1, further comprising:
at the second logic, inserting an integrity validation value into at least one DDP compliant network protocol unit.

6. The method of claim 1, wherein the at least one header fields field generated at the second logic are selected from a group consisting of: a DDP header field, an MPA header field, a TCP header field, and an IP header field.

7. The method of claim 1, further comprising:
at the second logic, updating header fields for the header portion of at least one DDP compliant network protocol unit.

8. The method of claim 7, wherein the updated header fields are selected from a group consisting of: a TCP header field and an IP header field.

9. The method of claim 1, wherein the at least one header field generated at the first logic is selected from a group consisting of: an RDMA header field, a TCP header field, and an IP header field.

10. An apparatus comprising:
network protocol unit transmitter logic; and
a logic including a processor, wherein
the processor is to request formation of at least one field in a header of a network protocol unit,
the network protocol unit transmitter logic is to form at least one field of the header, and
the network protocol unit transmitter logic is to form a network protocol unit using at least one field formed at the request of the processor and at least one field formed by the network protocol unit transmitter logic, and
the logic is capable to offload to the network protocol unit transmitter logic one or more operation capable of being performed by the processor and related to forming a network protocol unit compliant with Direct Data Placement (DDP), wherein the one or more operation is selected from a group consisting of: inserting a marker into a network protocol unit, inserting a pad into a network protocol unit, determining an integrity validation value for a network protocol unit, and inserting an integrity validation value into a network protocol unit.

11. The apparatus of claim 10, wherein to form at least one field of the header, the network protocol unit transmitter logic is to generate one or more header field selected from a group consisting of: a DDP header field, an MPA header field, a TCP header field, and an IP header field.

12. The apparatus of claim 10, wherein the segmenting a payload portion of a network protocol unit comprises retrieving a portion of data having a size prescribed by DDP.

13. The apparatus of claim 10, wherein the integrity validation value comprises a cyclical redundancy check value.

14. A computer-readable medium comprising instructions stored thereon which when executed by a machine cause the machine to:

issue a request to form a network protocol unit compliant with Direct Data Placement (DDP);
translate the request into a second request;
transfer the second request from a first logic to a second logic, wherein
the first logic is to generate at least one header field for a header portion of at least one DDP compliant network protocol unit,
the second request references the generated at least one header field and
in response to the second request, the second logic is to generate at least one header field,
form a network protocol unit using the at least one header field generated by the first logic and using the at least one header field generated by the second logic,
perform one or more operation selected from a group consisting of: segmenting a payload portion of a network protocol unit, inserting a marker into a network protocol unit, inserting a pad into a network protocol unit, determining an integrity validation value for a network protocol unit, and inserting an integrity validation value into a network protocol unit.

15. The computer-readable medium of claim 14, wherein the second request references a header, data, and a context.

16. The computer-readable medium of claim 14, wherein to generate at least one header field, the second logic is to generate one or more header field selected from a group consisting of: a DDP header field, an MPA header field, a TCP header field, and an IP header field.

17. The computer-readable medium of claim 14, wherein the segmenting a payload portion of a network protocol unit comprises retrieving a portion of data having a size prescribed by DDP.

18. The computer-readable medium of claim 14, wherein the integrity validation value comprises a cyclical redundancy check value.

19. The computer-readable medium of claim 14, wherein the instructions which when executed by a machine cause the machine to issue a request to form a network protocol unit compliant with Direct Data Placement (DDP) comprise a stack.

20. The computer-readable medium of claim 14, wherein the instructions which when executed by a machine cause the machine to translate the request into a second request comprise a network component driver.

21. A system comprising:
a host system comprising a processor and memory, wherein the host system comprises:
logic to issue a request to form a network protocol unit compliant with Direct Data Placement (DDP);
a network component to receive the request and in response to the request is to form a network protocol unit compliant with DDP and wherein
the host system comprises logic to generate at least one header field for the header portion of the network protocol unit and provide the generated at least one header field to the network component,
the network component is to generate at least one header field for the header portion of the network protocol unit,
the network component is to form the network protocol unit using at least one header field generated by the host system and using at least one header field generated by the network component, and the network component is to perform one or more operation selected from a group consisting of: segment a payload portion of a network protocol unit, insert a marker into a network protocol unit, insert a pad into a network protocol unit, determine an integrity validation value for a network protocol unit, and insert an integrity validation value into a network protocol unit; and a display device communicatively coupled to the host system.

22. The system of claim 21, wherein to generate at least one header field for the header portion of the network protocol unit, the network component is to generate one or more header field selected from a group consisting of: a DDP header field, an MPA header field, a TCP header field, and an IP header field.

23. The system of claim 21, wherein to segment a payload portion of a network protocol unit, the network component is to retrieve a portion of data having a size prescribed by DDP.

24. The system of claim 21, wherein the integrity validation value comprises a cyclical redundancy check value.

25. The system of claim 21, wherein the at least one header field generated by the host system includes an RDMA header field and includes at least one field selected from a group consisting of: a TCP header field and an IP header field.

26. The method of claim 1, wherein the at least one header field generated at the first logic comprise at least one of: source and destination IP addresses, version, Type of Service, Time to Live, protocol ID, TCP header length, TCP source port, TCP destination port, segment acknowledgement number, segment window, and options.

27. The method of claim 1, wherein the first logic comprises a host system and the second logic comprises a network component.

28. The apparatus of claim 10, wherein the at least one field in a header of a network protocol unit formed at the request of the processor comprises at least one of an RDMA header field, a TCP header field, and an IP header field.

29. The computer-readable medium of claim 14, wherein the first logic comprises a host system and the second logic comprises a network component.

* * * * *